United States Patent [19]
Schillaci

[11] Patent Number: 5,108,028
[45] Date of Patent: Apr. 28, 1992

[54] REUSABLE, COLLAPSIBLE, BULK CONTAINER

[75] Inventor: Rosario J. Schillaci, Spotswood, N.J.

[73] Assignee: Container Corporation of America, Clayton, Mo.

[21] Appl. No.: 791,780

[22] Filed: Nov. 12, 1991

[51] Int. Cl.$^5$ .................. B65D 5/56; B65D 51/00
[52] U.S. Cl. .................. 229/123.1; 220/418; 229/136; 229/245
[58] Field of Search .......... 229/23 R, 123.1, 136, 229/245, 247; 220/416, 418

[56] References Cited

U.S. PATENT DOCUMENTS

| | | | |
|---|---|---|---|
| 2,737,336 | 3/1956 | Moore | 229/23 R |
| 3,074,617 | 1/1963 | Kindseth et al. | 229/23 R |
| 3,078,027 | 2/1963 | Keith | 229/123.1 |
| 3,749,300 | 7/1973 | Jones | 229/123.1 |
| 4,050,623 | 9/1977 | Vacchi | 229/23 R |
| 4,165,030 | 8/1979 | Bunger et al. | 229/23 R |
| 4,635,795 | 1/1987 | DeFlander et al. | 229/245 |
| 4,848,651 | 7/1989 | Hartness | 229/123.1 |
| 4,880,141 | 11/1989 | Gossler et al. | 229/23 R |

FOREIGN PATENT DOCUMENTS

| | | | |
|---|---|---|---|
| 6813 | 1/1980 | European Pat. Off. | 229/23 R |
| 4632 | 1/1990 | Japan | 229/123.1 |

Primary Examiner—Gary E. Elkins
Attorney, Agent, or Firm—Richard W. Carpenter

[57] ABSTRACT

A reusable, collapsible, bulk container having pairs of opposed side walls, each of which has foldably joined to the lower end thereof a narrow bottom wall retaining flange. The retaining flange of one side wall is permanently adhesively secured to a margin of a bottom wall panel, and the other flanges are coated with a pressure sensitive type of adhesive substance adapted to releasably adhere to, upon contact with, other marginal portions of the bottom wall panel when said carton is erected.

18 Claims, 4 Drawing Sheets

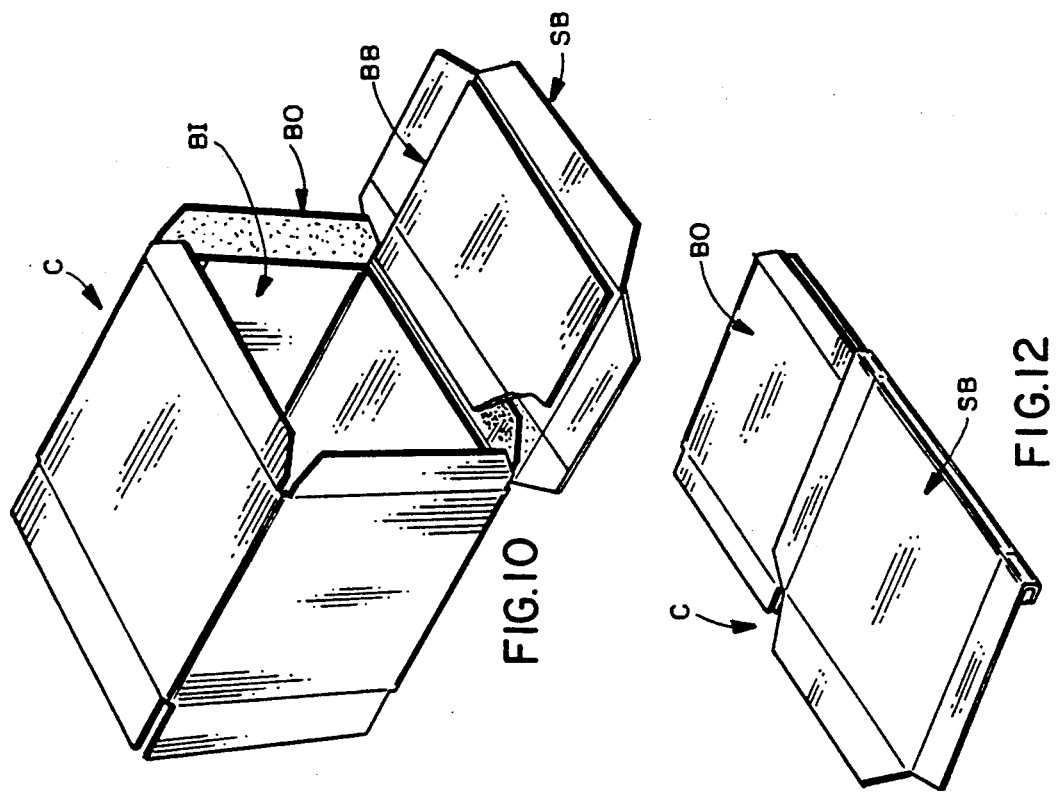
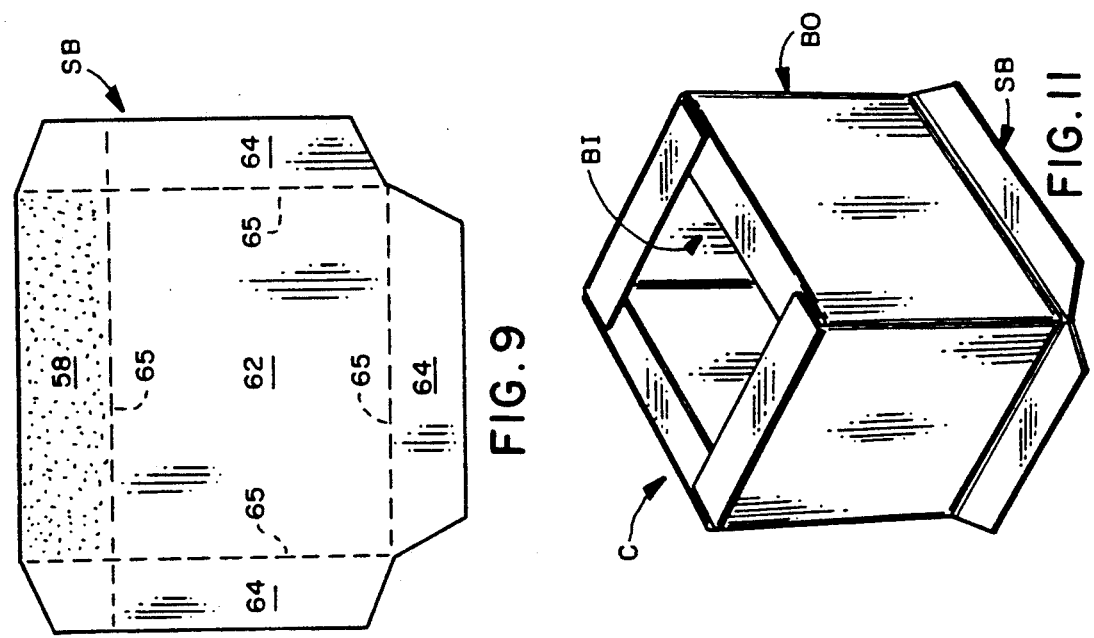

REUSABLE, COLLAPSIBLE, BULK CONTAINER

BACKGROUND OF THE INVENTION

1. Field of the Invention

This invention relates to bulk containers formed of paperboard, and more particularly to a reusable, collapsible, bulk container with a bottom wall having one marginal portion permanently attached to a bottom wall retaining flange extending from one side wall of the container and having other marginal portions releasably attached to bottom wall retaining flanges extending from other side walls of the container, so the container can be readily collapsed, with the bottom wall folded against one of the side walls.

2. Description of Background Art

A background art search directed to the subject matter of this application conducted in the U.S. Patent and Trademark Office disclosed the following U.S. Pat. Nos.:

| | | | |
|---|---|---|---|
| 210,887 | 384,038 | 460,293 | 616,869 |
| 1,591,734 | 1,800,816 | 2,132,666 | 2,485,028 |
| 2,733,852 | 2,902,204 | 2,910,221 | 3,040,958 |
| 3,063,593 | 3,124,292 | 3,126,143 | 3,251,533 |
| 3,873,017 | 4,127,230 | 4,505,423 | 4,693,413 |

None of the patents found in the search discloses a collapsible, reusable bulk container having a bottom wall permanently adhesively secured to one retaining flange and releasably adhesively secured to other retaining flanges, so the container can be collapsed for shipment, erected for initial use, again collapsed for storage, and later re-erected for reuse.

SUMMARY OF THE INVENTION

It is a primary object of the invention to provide an improved, collapsible, reusable, bulk shipping container.

A more specific object of the invention is the provision of a paperboard bulk container of the type described that includes a bottom wall panel permanently adhesively attached to a bottom wall retaining flange of one side wall and releasably adhesively attached to bottom wall retaining flanges of other side walls to allow the container to be readily collapsed for shipment and readily erected for use or reuse.

These and other objects of the invention will be apparent from an examination of the following description and drawings.

BRIEF DESCRIPTION OF THE DRAWINGS

FIG. 9 is a plan view of the upper side of the blank used to form the outer slip sheet illustrated in the following views;

FIG. 10 is a fragmentary isometric of a container of the type illustrated in the earlier views, but shown lying on one side in a partly erected condition and having attached thereto a slip sheet embodying features of the invention;

FIG. 11 is a view similiar to that of FIG. 10, but with the container shown in an upright position and in an erected and closed condition; and FIG. 12 is a fragmentary isometric view of the container of FIGS. 10 and 11, shown in a collapsed condition.

It will be under stood that, for purposes of clarity, certain elements may have been intentionally omitted from certain views where they are believed to be illustrated to better advantage in other views.

DESCRIPTION OF THE PREFERRED EMBODIMENT

Figure 1:
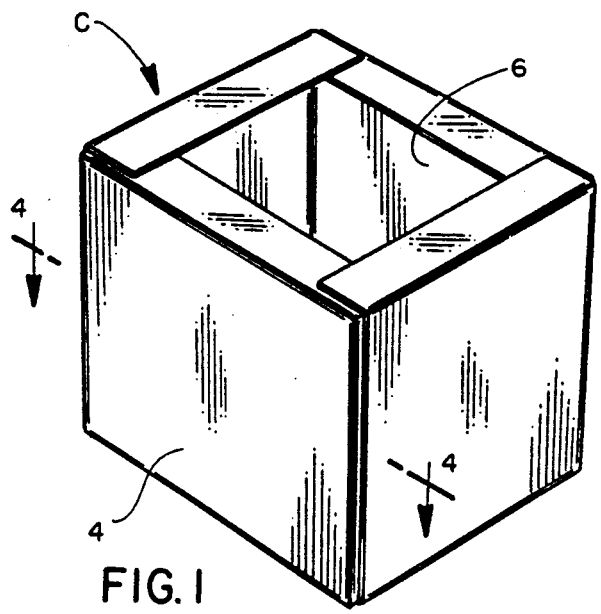
FIG. 1 is a fragmentary isometric view of an erected bulk container embodying features of the present invention.
Figure 2:
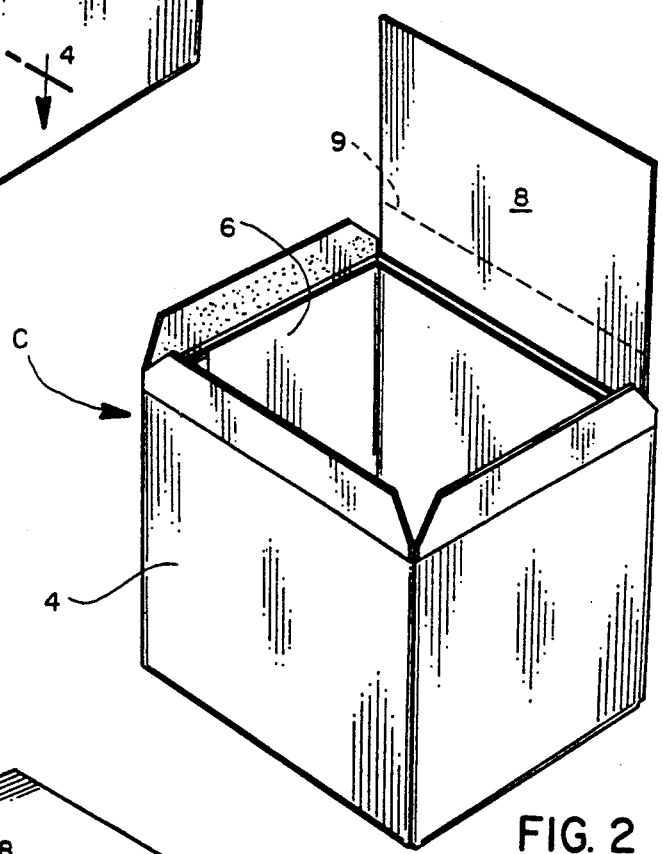
FIG. 2 is a view similar to that of FIG. 1, but showing the container in an inverted position and with the bottom wall partly separated from certain of the bottom wall retaining flanges.

Referring now to the drawings for a better understanding of the invention, it will be seen that the bulk container embodying features of the invention, and indicated generally at C in FIG. 1 of the drawings, includes a pair of tubular outer and inner body members 4 and 6, respectively, and a bottom wall member 8. The container may be may be formed from the composite blank CB of foldable paperboard illustrated in FIG. 8.

Figure 5:
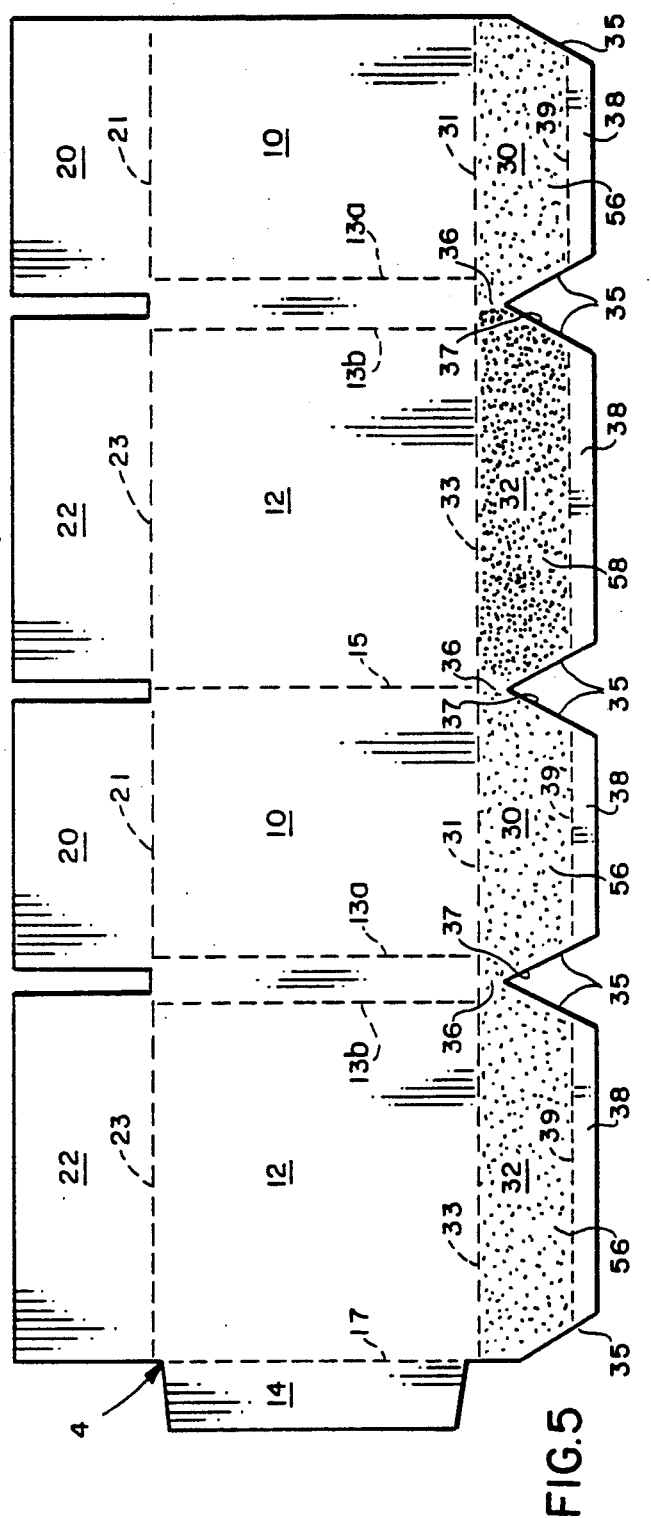
FIG. 5 is a plan view of the inside of the blank used to form the outer body member of the container illustrated in the previous views.
Figure 6:
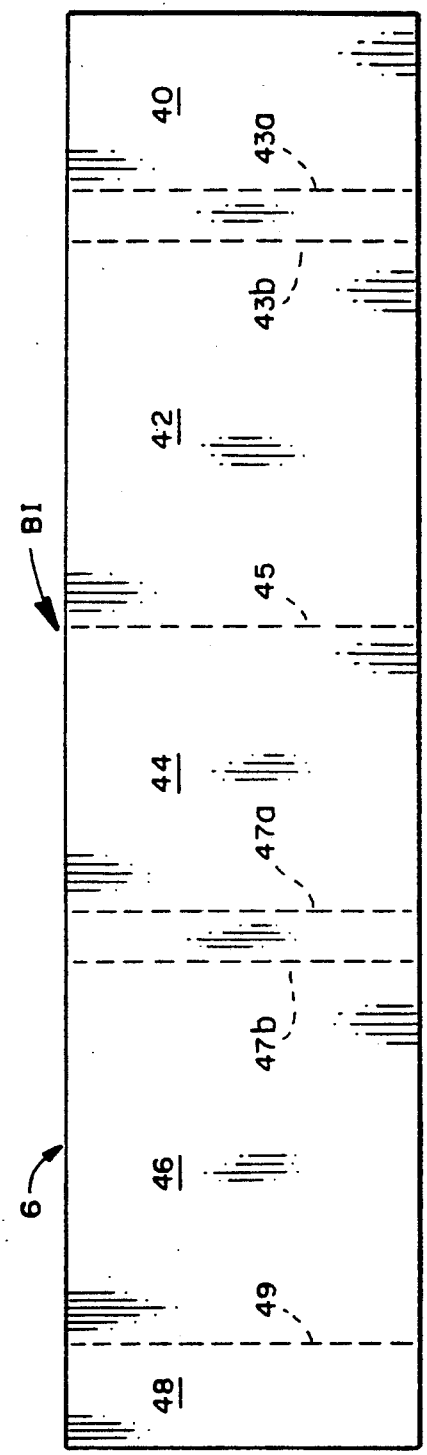
FIG. 6 is a plan view of the inside of the blank used to form the inner body member of the container illustrated in the previous views.
Figure 7:
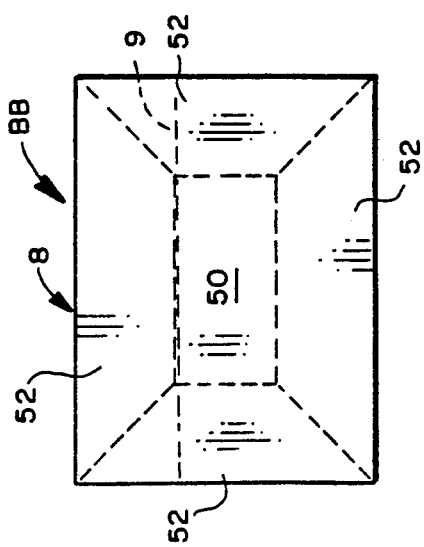
FIG. 7 is a plan view of the outside of the blank used to form the bottom wall of the container illustrated in the previous views.

Composite blank CB is in turn formed from a separate unitary outer body member blank BO, an inner body member blank BI, and a bottom wall panel blank BB which blanks are illustrated in FIGS. 5, 6, and 7, respectively.

As best seen in FIG. 5, outer body blank BO has a central portion that includes a first minor side wall panel 10, a first major side wall panel 12, a second minor side wall panel 10, a second major side wall panel 12, and a glue panel 14, which are foldably joined to each other along parallel fold lines 13a–13b, 15, 13a–13b, and 17, respectively. In order to facilitate folding the container to collapse it, both working fold lines 13a–13b are preferably double scores.

The upper end of the container outer body member may be provided with minor top closure flaps 20 and major top closure flaps 22, which are foldably joined along aligned fold lines 21 and 23 to upper edges of minor and major side wall panels 10 and 12, respectively.

If desired, other types of top closure arrangements may be provided. Also, athough the container is shown and described herein as being oblong, it may also be square or of any other rectilinear configuration, so long as it has an even number of sides to allow it to be collapsed.

The essential feature of the invention is the unique construction of the bottom closure arrangement which allows the large bulk container to be shipped flat, readily erected, easily collapsed again after being emptied, and then readily re-erected for reuse.

Still referring to FIG. 5, it will be seen that bottom wall retaining flanges 30 and 32 are foldably joined along aligned fold lines 31 and 33 to lower edges of outer body side wall panels 10 and 12, respectively.

Each of the bottom wall retaining flanges is generally trapezoidal in shape and is in part defined by a pair of diverging side edges 35 that form V-shaped openings 37 between adjacent flanges. Also, it should be noted that the side edges do not extend all the way up to the fold lines joining the bottom wall retaining flanges to their respective side wall panels.

The purpose of this is to leave an area of uncut material 36 between adjacent flanges in order to prevent the formation of pin holes at the lower corners of the container after it has been erected and filled.

Each bottom wall retaining flange has a relatively narrow release tab 38 foldably joined to its free outer edge along a reverse fold line 39. The function of the release tabs is to facilitate collapsing the container after its initial use, as hereinafter described.

The inner body member blank BI, illustrated in FIG. 6, includes a first minor side wall panel first section 40, a first major side wall panel 42, a second minor side wall panel 44, a second major side wall panel 46, and a first minor side wall panel second section 48 foldably joined to each other along parallel fold lines 43a–43b, 45, 47a–47b, and 49, respectively. Fold lines 43a–43b and 47a–47b are preferably double fold lines.

The third component of the container, shown in FIG. 7, is bottom wall panel 8, which has a rectangular center panel 50 with marginal areas 52. To provide clearance to facilitate collapsing the container, The bottom wall panel length is slightly less than the distance between the outer side wall to which the bottom wall panel is attached and the opposite side wall panel.

The first step in the formation of the container C is the assembly of the composite blank CB from the other three blanks. Inner body blank BI is placed against the central portion of outer body blank BO and adhesively thereto, as illustrated in FIGS. 4 and 8.

Figure 4:
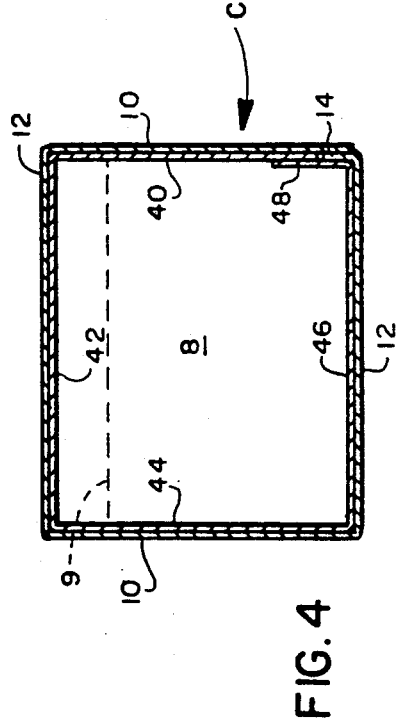
FIG. 4 is a horizontal sectional view taken on line 4—4 of FIG. 1.

As best seen in FIG. 4, outer body member glue panel 14 and inner body member first minor side wall panel first section 40 are co-planer with abutting end edges. Inner body member first minor side wall panel second section 48 overlies and is adhesively secured to inner surfaces of panel section 40 and glue panel 14.

Figure 8:
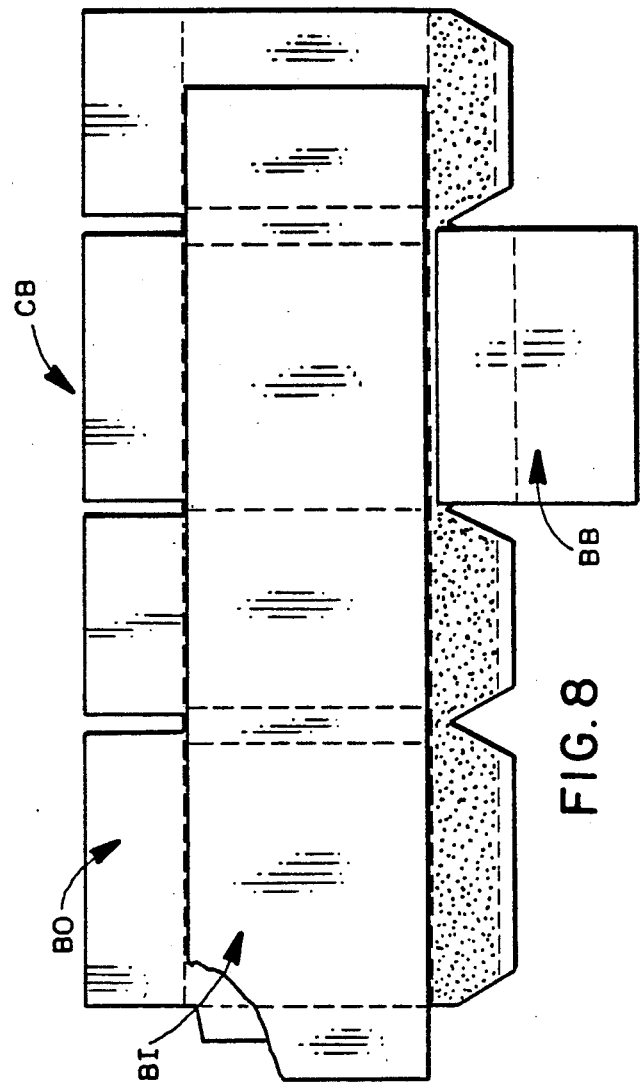
FIG. 8 is a plan view of the inside of the composite blank used to form the container illustrated in the previous views.

At about the same time, one marginal area 52 of bottom wall panel 8 is permanently attached to one of the bottom wall retaining flanges by a permanent or non-resealable adhesive indicated at 58 in FIGS. 5 and 8.

Also, the inner surfaces of the remaining bottom wall retaining flanges are coated with a pressure senstive, resealable adhesive indicated at 56, so that when they contact the other marginal areas 52 of the bottom wall panel 8, as the container is erected, they will immediately adhere thereto, but can be easily separated therefrom when it it necessary to re-collapse the container.

Figure 3:
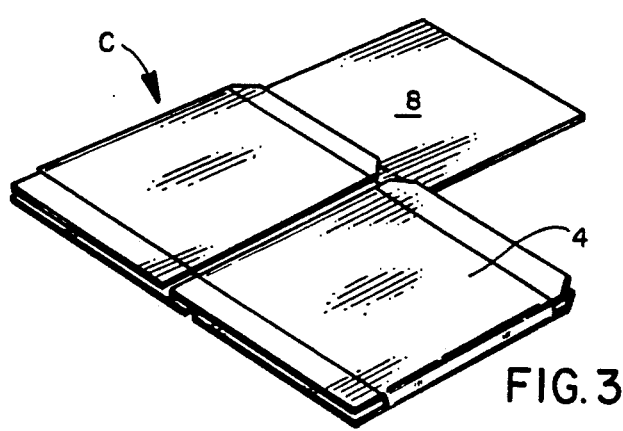
FIG. 3 is a fragmentary isometric view of the container illustrated in the previous views, but shown in a partly collapsed condition.

After the container has been formed it can be collapsed, as illustrated in FIG. 3, for shipment or storage. By folding the bottom wall panel 180 degrees about fold line 9, before the container is collapsed, the bottom wall panel 8 can be inserted into the container to lie against the inside surface of the container side wall to which it is foldably joined.

To erect the container for initial use, it is opened and the bottom wall panel is folded downwardly 90 degrees, so that its free marginal areas can be pressed against and releasably secured to the other bottom wall retaining flanges.

After the container has been used, in order to re-collapse it, the release tabs 38 are grasped, and the bottom wall panel is pushed away from three of the retaining flanges and folded to lie against the inner surface of the outer body member side wall panel to which it remains permanently attached.

Referring now to FIGS. 9–12 of the drawings, it will be seen that a modified form of the invention is illustrated. In this embodiment the construction of the container C1 is identical to that of container C of the previously described embodiment, except for the addition of a slip sheet 60 that is permanently attached to the container C1 in a manner hereinafter described.

Accordingly, all of the components of container C1 corresponding to similar components of container C have been identified by the same numerals.

Slip sheet 60, which may be used for certain products in place of a conventional pallet, may be formed from the unitary blank SB of foldable corrugated or solid fibre paperboard illustrated in FIG. 9.

The slip sheet comprises a generally rectangular center portion 62 having a plurality of flanges 64 joined to the side edges thereof along fold lines 65.

As seen in FIG. 9 each one of the flanges 64 is coated on the inside or upper surface with a resealable pressure sensitive adhesive 56 of the same type used to attach the bottom wall panel 8 to three of the container side wall flanges. When the container composite blank is formed, one slip sheet flange 64 is releasably attached to the outside surface of the same container side wall flange to which the bottom wall panel is attached. This is best seen in FIG. 10.

As the container is collapsed, the slip sheet may be folded to lie against the outside surface of the container side wall to which it is attached, as best seen in FIG. 12.

When the carton is erected and closed, as shown in FIG. 11, the slip sheet is folded 270 degrees, along with the bottom wall panel 8, so that it extends horizontally across the container under the bottom wall panel with its other three flanges 64 extending beyond the side walls of the container, where any one can be grasped by a clamp of conventional handling equipment.

What is claimed is:
1. A reusable, collapsible, bulk container formed from foldable sheet material, such as paperboard, comprising:
 (a) an outer body member including first and second pairs of opposed outer side wall panels foldably joined to each other to form a rectangular tubular structure open at the ends;
 (b) an inner body member including first and second pairs of opposed inner side wall panels foldably joined to each other to form a rectangular tubular structure open at the ends;
 (c) said inner body member side wall panels having outer surfaces laminated to inner surfaces of adjacent outer body member side wall panels to form a composite tubular structure;
 (d) said outer body member side wall panels each having foldably joined to a lower edge thereof, and disposed to extend inwardly therefrom, a bottom wall retaining flange;
 (e) a rectangular bottom wall panel having marginal areas disposed to overlie respective bottom wall retaining flanges;

(f) one of said bottom wall panel marginal areas being permanently adhesively attached to an inner surface of one of said bottom wall retaining flanges;

(g) the other three of said bottom wall panel marginal areas being releasably attached by a pressure sensitive type adhesive to inner surfaces of the other three of said bottom wall retaining flanges, whereby when said bulk container has been emptied, said other three bottom wall panel marginal areas can be readily released from said other three retaining flanges to allow the container to be collapsed.

2. A bulk container according to claim 1, wherein said pressure sensitive adhesive can be used more than one time.

3. A bulk container according to claim 1, and including release tabs foldably joined to free outer edges of said bottom wall retaining flanges and being free from adhesive attachment to said bottom wall panel.

4. A bulk container according to claim 1, and including a paperboard slip sheet having one marginal portion attached to said one bottom wall retaining flange on the opposite side of said flange to which said bottom wall panel marginal area is attached, said slip sheet being arranged and disposed to be folded in one direction to lie against an outer surface of an adjacent body member side wall panel when said container is in a collapsed condition and arranged and disposed to be folded in the opposite direction to lie against an outer surface of said bottom wall panel when said container is in a closed condition, said slip sheet having other marginal portions extending outwardly beyond other of said container side wall panels when said container is in an erected condition.

5. A bulk container according to claim 4, wherein said slip sheet is attached to said one bottom wall panel retaining flange by a releasable, pressure sensitive adhesive.

6. A reusable, collapsible, bulk container formed from foldable sheet material, such as paperboard, comprising:

(a) an outer body member including pairs of opposed outer side wall panels foldably joined to each other to form a rectangular tubular structure open at the ends;

(b) said outer body member side wall panels each having foldably joined to a lower edge thereof, and disposed to extend inwardly therefrom, a bottom wall retaining flange;

(c) a rectangular bottom wall panel having marginal areas disposed to overlie respective bottom wall retaining flanges;

(d) one of said bottom wall panel marginal areas being permanently adhesively attached to an inner surface of one of said bottom wall retaining flanges;

(e) the other of said bottom wall panel marginal areas being releasably attached by a pressure sensitive type adhesive to inner surfaces of the other of said bottom wall retaining flanges, whereby when said bulk container has been emptied, said other three bottom wall panel marginal areas can be readily released from said other three retaining flanges to allow the container to be collapsed.

7. A bulk container according to claim 6, and including:

(a) an inner body member including first and second pairs of opposed inner side wall panels foldably joined to each other to form a rectangular tubular structure open at the ends;

(b) said inner body member side wall panels having outer surfaces laminated to inner surfaces of adjacent outer body member side wall panels to form a composite tubular structure.

8. A bulk container according to claim 6, wherein said pressure sensitive adhesive can be used more than one time.

9. A bulk container according to claim 7, wherein said pressure sensitive adhesive can be used more than one time.

10. A bulk container according to claim 6, and including release tabs foldably joined to free outer edges of said bottom wall retaining flanges and being free from adhesive attachment to said bottom wall panel.

11. A bulk container according to claim 7, and including release tabs foldably joined to free outer edges of said bottom wall retaining flanges and being free from adhesive attachment to said bottom wall panel.

12. A bulk container according to claim 6, and including a paperboard slip sheet having one marginal portion attached to said one bottom wall retaining flange on the opposite side of said flange to which said bottom wall panel marginal area is attached, said slip sheet being arranged and disposed to be folded in one direction to lie against an outer surface of an adjacent body member side wall panel when said container is in a collapsed condition and arranged and disposed to be folded in the opposite direction to lie against an outer surface of said bottom wall panel when said container is in a closed condition, said slip sheet having other marginal portions extending outwardly beyond other of said container side wall panels when said container is in an erected condition.

13. A bulk container according to claim 12, wherein said slip sheet is attached to said one bottom wall panel retaining flange by a releasable, pressure sensitive adhesive.

14. A blank of foldable sheet material, such as paperboard, for use in making a reusable, collapsible bulk container, said blank being cut and scored to provide:

(a) an outer body member having an even number of, but not less than four, rectilinear side wall panels foldably joined to each other along parallel fold lines;

(b) a relatively narrow glue panel foldably joined to one of said side wall panels, at one side of the blank;

(c) generally trapezoidal shaped bottom wall retaining flanges foldably joined to corresponding lower end edges of respective side wall panels along aligned fold lines;

(d) a rectilinear bottom wall panel having one marginal portion permanently adhesively secured to the retaining flange of one of said side wall panels;

(e) the retaining flanges of the other of said side wall panels each being coated with a pressure sensitive type of adhesive adapted to releasably adhere to, upon contact with, other marginal portions of said bottom wall panel, when said carton is erected.

15. A blank according to claim 14, wherein said pressure sensitive adhesive can be used more than one time.

16. A blank according to claim 14, and including release tabs foldably joined to free outer edges of said bottom wall retaining flanges and being free from adhesive attachment to said bottom wall panel.

17. A blank of foldable sheet material according to claim 14, and including a paperboard slip sheet forming panel having one marginal portion attached to a retaining flange of one of said side walls on the opposite side of said flange to which said bottom wall panel marginal area is attached, said slip sheet being arranged and disposed to be folded in one direction to lie against an outer surface of an adjacent body member side wall panel when said container is in a collapsed condition and arranged and disposed to be folded in the opposite direction to lie against an outer surface of said bottom wall panel when said container is in a closed condition, said slip sheet having other marginal portions arranged and disposed to extend outwardly beyond other of said container side wall panels when said container is in an erected condition.

18. A blank of foldable sheet material according to claim 17, wherein said slip sheet is attached to said one side wall panel retaining flange by a releasable, pressure sensitive adhesive.

* * * * *